United States Patent
Srinivasa et al.

(10) Patent No.: US 9,391,811 B2
(45) Date of Patent: *Jul. 12, 2016

(54) CHANNEL DESCRIPTION FEEDBACK IN A COMMUNICATION SYSTEM

(71) Applicant: Marvell World Trade Ltd., St. Michael (BB)

(72) Inventors: Sudhir Srinivasa, Campbell, CA (US); Hongyuan Zhang, Fremont, CA (US); Hyukjoon Kwon, San Diego, CA (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

This patent is subject to a terminal disclaimer.

(21) Appl. No.: 14/859,993

(22) Filed: Sep. 21, 2015

(65) Prior Publication Data

US 2016/0013965 A1    Jan. 14, 2016

Related U.S. Application Data

(63) Continuation of application No. 13/207,003, filed on Aug. 10, 2011.

(60) Provisional application No. 61/407,705, filed on Oct. 28, 2010, provisional application No. 61/372,376, filed on Aug. 10, 2010.

(51) Int. Cl.
*H04L 27/28* (2006.01)
*H04L 25/02* (2006.01)
(Continued)

(52) U.S. Cl.
CPC .......... *H04L 25/0202* (2013.01); *H04B 7/0417* (2013.01); *H04L 1/0693* (2013.01); *H04L 5/0023* (2013.01); *H04L 25/022* (2013.01); *H04L 25/0206* (2013.01)

(58) Field of Classification Search
CPC . H04L 1/0693; H04L 5/0023; H04L 25/0206; H04L 25/022; H04B 7/0417
See application file for complete search history.

(56) References Cited

U.S. PATENT DOCUMENTS 7,940,638 B2    5/2011 Sandhu
8,526,351 B2    9/2013 Fischer et al.
(Continued)

FOREIGN PATENT DOCUMENTS

CN    101427485 A    5/2009
WO    WO-2006/112133    10/2006
WO    WO-2007/127744    11/2007

OTHER PUBLICATIONS

IEEE Std P802.11-REVma/06.0, (Revision of IEEE Std 802.11-1999) "Unapproved Draft Standard for Information Technology—Telecommunications and information exchange between systems—Local and metropolitan area network—Specific requirements Part 11: Wireless LAN Medium Control (MAC) and Physical Layer (PHY) specifications," (This document reflects the combining of the 2003 Edition of 802.11 plus the 802.11 g, 802.11 h, 802.11 i and 802.11j Amendments) (Superseded b P802.11-REVma_D7.0), pp. 1-1212 (2006).

(Continued)

*Primary Examiner* — Sophia Vlahos

(57) ABSTRACT

In a method for estimating a channel between a transmitter and a receiver in a communication network, a plurality of training signal fields are received at the receiver. Each training signal field includes a plurality of orthogonal frequency division multiplexing (OFDM) tones, and the OFDM tones include at least a plurality of training data tones and one or more pilot tones. Channel estimate data corresponding to the plurality of training data tones and the one or more pilot tones is determined. Channel estimate data corresponding to only a subset of the OFDM tones or data generated using the channel estimate data corresponding to the subset of OFDM tones is transmitted to the transmitter, wherein the subset excludes pilot tones.

10 Claims, 9 Drawing Sheets

(51) Int. Cl.
  H04B 7/04    (2006.01)
  H04L 1/06    (2006.01)
  H04L 5/00    (2006.01)

(56) References Cited

U.S. PATENT DOCUMENTS

| | | | |
|---|---|---|---|
| 8,724,720 | B2 | 5/2014 | Srinivasa et al. |
| 2007/0183521 | A1 | 8/2007 | Cheng et al. |
| 2007/0249296 | A1 | 10/2007 | Howard et al. |
| 2011/0310827 | A1 | 12/2011 | Srinivasa et al. |
| 2012/0039406 | A1 | 2/2012 | Srinivasa et al. |

OTHER PUBLICATIONS

IEEE Std 802.11-2007 (revision of IEEE Std. 802.11-1999) "Information Standard for Information technology—Telecommunications and information exchange between systems—Local and metropolitan area networks—Specific requirements" Part 11: Wireless LAN Medium Access Control (MAC) and Physical Layer (PHY) Specifications, The Institute of Electrical and Electronics Engineers, Inc., pp. 1-1184 (Jun. 12, 2007).

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.*, pp. 1-83 (Sep. 1999).

IEEE Std 802.11b-1999/Cor 1-2001 (Corrigendum to IEEE Std 802.11b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band-Corrigendum 1," *The Institute of Electrical and Electronics Engineers, Inc.*, pp. 1-23 (Nov. 7, 2001).

IEEE Std 802.11g/D8.2, Apr. 2003 (Supplement to ANSI/IEEE Std 802.11, 1999 (Reaff 2003)) "Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band," *The Institute of Electrical and Electronics Engineers, Inc.*, pp. 1-69 (Apr. 2003).

IEEE P802.11n™/D3.00, "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Higher Throughput," *The Institute of Electrical and Electronics Engineers, Inc.*, pp. 1-544 (Sep. 2007).

IEEE Std. 802.11n™ "IEEE Standard for Information Technology—Telecommunications and information exchange between systems—Local and metropolitan area network—Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, pp. 1-535 (Oct. 2009).

Chen, "Home Network Basis: Transmission Environments and Wired/Wireless Protocols," *Prentice Hall*, pp. 1-26 (Jul. 2003).

Gunnam et al., "Multi-Rate Layered Decoder Architecture for Block LDPC Codes of the IEEE 802.11n Wireless Standard," IEEE International Symposium on Circuits and Systems, 2007 (ISCAS 2007), pp. 1645-1648 (2007).

Hiertz et al., "The IEEE 802.11 Universe," *IEEE Communications Magazine*, pp. 62-70, (Jan. 2010).

Imashioya et al., "RTL Design of 1.2 Gbps MIMO WLAN System and Its Business Aspect," IEEE 9th Int'l Symposium on Communications and Information Technology (ISCIT 2009), *The Institute of Electrical and Electronics Engineers*, pp. 296-301 (2009).

Khaled et al., "Interpolation-Based Multi-Mode Precoding for MIMO-OFDM Systems with Limited Feedback," IEEE Transactions on Wireless Communications, vol. 6, No. 3 (Mar. 2007).

Love et al., "An Overview of Limited Feedback in Wireless Communication Systems," IEEE J. on Selected Areas in Communications, vo. 26, No. 8, pp. 1341-1365 (Oct. 2008).

Mujtaba, "IEEE P802.11—Wireless LANs, TGn Sync Proposal Technical Specification," *The Institute of Electrical and Electronics Engineers, Inc.*, doc.: IEEE 802.11-04/0889r6, pp. 1-131 (May 2005).

Perahia et al., "Gigabit Wireless LANs: an overview of IEEE 802.11ac and 80211ad," ACM Sigmobile Mobile Computing and Communications Review, vol. 15, No. 3, pp. 23-33 (Jul. 2011).

Shi et al., "Phase Tracking During VHT-LTF," Doc. No. IEEE 802.11-10/07711-0, *The Institute of Electrical and Electronics Engineers, Inc.*, pp. 1-19 (Jul. 2010).

Stacey et al., "IEEE P802.11, Wireless LANs, Proposed TGac Draft Amendment," Institute of Electrical and Electronics Engineers, doc. No. IEEE 802.11-10/1361r3 pp. 1-154 (Jan. 2011).

Stacey et al., "Specification Framework for TGac," document No. IEEE 802.11-09/0992r20, *Institute for Electrical and Electronics Engineers*, pp. 1-49, (Jan. 18, 2011).

Syafei et al., "A Design of Next Generation Gigabit MIMO Wireless LAN System," IEEE 12th Int'l Conference on Advanced Communication Technology (ICACT 2010), *The Institute of Electrical and Electronics Engineers*, pp. 941-946 (2010).

Syafei et al., "A Gigabit MIMO WLAN System with International Standardization Strategy," IEEE Int'l Symposium on Intelligent Signal Processing and Communication Systems (ISPACS 2009), *The Institute of Electrical and Electronics Engineers*, pp. 228-231 (2009).

Syafei et al., "Design of 1.2 Gbps MIMO WLAN System for 4K Digital Cinema Transmission," IEEE 20th Int'l Symposium on Personal, Indoor and Mobile Radio Communications (PIMRC 2009), *The Institute of Electrical and Electronics Engineers*, pp. 207-211 (2009).

van Zelst et al., "Pilot Sequence for VHT-DATA," Doc. No. IEEE 802.11-10/0811r1, *The Institute of Electrical and Electronics Engineers, Inc.*, pp. 1-10 (Jul. 2010).

First Office Action in Chinese Application No. 201180038982.8, dated Feb. 2, 2015, with English translation (18 pages).

Notice of Reasons for Rejection in Japanese Application No. 2013-524204, dated Aug. 4, 2015, with English translation (4 pages).

Second Office Action in Chinese Application No. 201180038982.8, dated Aug. 18, 2015, with English translation (16 pages).

International Preliminary Report on Patentability and Written Opinion in International Application No. PCT/US2011/047254, dated Feb. 21, 2013.

International Search Report and Written Opinion in International Application No. PCT/US2011/047254, dated Nov. 8, 2011.

IEEE Std 802.16-2009 (Revision of IEEE Std. 802.16-2004), IEEE Standard for Local and metropolitan area networks: Part 16: Air Interface for Broadband Wireless Access Systems, *The Institute of Electrical and Electronics Engineers, Inc.*, 2082 pages (May 29, 2009).

Zhang et al., "VHT Link Adaptations," doc. No. IEEE802.11-11/0047r0, IEEE 802.11-11, 125th IEEE 802.11 Wireless Local Area Networks Session, Interim Meeting Session, Hyatt Century Plaza Hotel, Los Angeles, California, pp. 1-11 (Jan. 18, 2011).

Merlin et al., "VHT Control and Link Adaptation," doc. No. IEEE 802.11-11/0040r0, IEEE 802.22-11, 125th IEEE 802.11 Wireless Local Area Networks Session, Interim Meeting Session, Hyatt Century Plaza Hotel, Los Angeles, California, pp. 1-15 (Jan. 18, 2011).

Fischer et al., "Link Adaptation Subfield for VHT," doc. No. IEEE 802.11-10/1095r0, IEEE 802.11-10, 123rd IEEE 802.11 Wireless Local Area Networks session, Interim Meeting Session, Hilton Waikoloa Village, pp. 1-5 (Sep. 12, 2010).

FIG. 4

| BW | Grouping $Ng$ | $Ns$ | Carriers for which matrices are sent |
|---|---|---|---|
| 20MHz | 1 | 52 | All data subcarriers: -28, -27, ... -2, -1, 1, 2, ..., 27, 28<br>Note that no pilot subcarriers are fed back |
| | 2 | 30 | -28, -26, -24, -22, -20, -18, -16, -14, -12, -10, -8, -6, -4, -2, -1, 1, 3, 5, 6, 9, 11, 13, 15, 17, 19, 20, 23, 25, 27, 28 |
| | 4 | 16 | -28, -24, -20, -16, -12, -8, -4, -1, 1, 5, 9, 13, 17, 20, 25, 28 |

FIG. 5

| BW | Grouping Ng | Ns | Carriers for which matrices are sent |
|---|---|---|---|
| 20MHz | 1 | 52 | All data subcarriers: -28, -27, ... ,-2, -1, 1, 2, ... ,27, 28 Note that no pilot subcarriers are fed back |
| | 2 | 30 | -28, -26, -24, -22, -20, -18, -16, -14, -12, -10, -8, -6, -4, -2, -1, 28, 26, 24, 22, 20, 18, 16, 14, 12, 10, 8, 6, 4, 2, 1 |
| | 4 | 16 | -28, -24, -20, -16, -12, -8, -4, -1, 1, 4, 8, 12, 16, 20, 24, 28 |

FIG. 6

| BW | Grouping Ng | Ns | Carriers for which matrices are sent |
|---|---|---|---|
| 40MHz | 1 | 108 | All data subcarriers: -58, -57, ... -3, -2, 2, 3, ... ,57, 58 Note that no pilot subcarriers are fed back |
| | 2 | 58 | -58, -56, -54, -52, -50, -48, -46, -44, -42, -40, -38, -36, -34, -32, -30, -28, -26, -24, -22, -20, -18, -16, -14, -12, -10, -8, -6, -4, -2, 2, 4, 6, 8, 10, 12, 14, 16, 18, 20, 22, 24, 26, 28, 30, 32, 34, 36, 38, 40, 42, 44, 46, 48, 50, 52, 54, 56, 58 |
| | 4 | 30 | -58, -54, -50, -46, -42, -38, -34, -30, -26, -22, -18, -10, -10, -6, -2, 2, 6, 10, 14, 18, 22, 26, 30, 34, 38, 42, 46, 50, 54, 58 |

FIG. 7

| BW | Grouping Ng | Ns | Carriers for which matrices are sent |
|---|---|---|---|
| 80MHz/160MHz | 1 | 234 | All data subcarriers: -122, -121, -120, -119, -118, -117, -116, ..., -2, 2, 3, ..., 117, 118, 119, 120, 121, 122<br>Note that no pilot subcarriers are fed back |
| | 2 | 122 | -122, -119, -117, -115, -113, -111, -109, -107, -105, -102, -101, -99, -97, -95, -93, -91,<br>-89, -87, -85, -83, -81, -79, -77, -74, -73, -71, -69, -67, -65, -63, -61, -59,<br>-57, -55, -53, -51, -49, -47, -45, -43, -41, -38, -37, -35, -33, -31, -29, -27,<br>-25, -23, -21, -19, -17, -15, -13, -10, -9, -7, -5, -3, -2, 2, 3, 5, 7, 9, 10,<br>13, 15, 17, 19, 21, 23, 25, 27, 29, 31, 33, 35, 37, 38, 41, 43, 45, 47, 49, 51,<br>53, 55, 57, 59, 61, 63, 65, 67, 69, 71, 73, 74, 77, 79, 81, 83, 85, 87, 89, 91,<br>93, 95, 97, 99, 101, 102, 105, 107, 109, 111, 113, 115, 117, 119, 122 |
| | 4 | 62 | -122, -117, -113, -109, -105, -101, -97, -93, -89, -85, -81, -77, -73, -69, -65, -61,<br>-57, -53, -49, -45, -41, -37, -33, -29, -25, -21, -17, -13, -9, -5, -2, 2, 5,<br>9, 13, 17, 21, 25, 29, 33, 37, 41, 45, 49, 53, 57, 61, 65, 69, 73, 77, 81, 85,<br>89, 93, 97, 101, 105, 109, 113, 117, 122 |

FIG. 8

| BW | Grouping $Ng$ | $Ns$ | Carriers for which matrices are sent |
|---|---|---|---|
| 80MHz/160MHz | 1 | 224 | All data subcarriers: -117, -116, ..., -2, 2, 3, ..., 117<br>Note that no pilot subcarriers are fed back |
| | 2 | 118 | -117, -115, -113, -111, -109, -107, -105, -102, -101, -99, -97, -95, -93, -91, -89, -87, -85, -83, -81, -79, -77, -74, -73, -71, -69, -67, -65, -63, -61, -59, -57, -55, -53, -51, -49, -47, -45, -43, -41, -38, -37, -35, -33, -31, -29, -27, -25, -23, -21, -19, -17, -15, -13, -10, -9, -7, -5, -3, -2, 2, 3, 5, 7, 9, 10, 13, 15, 17, 19, 21, 23, 25, 27, 29, 31, 33, 35, 37, 38, 41, 43, 45, 47, 49, 51, 53, 55, 57, 59, 61, 63, 65, 67, 69, 71, 73, 74, 77, 79, 81, 83, 85, 87, 89, 91, 93, 95, 97, 99, 101, 102, 105, 107, 109, 111, 113, 115, 117 |
| | 4 | 60 | -117, -113, -109, -105, -101, -97, -93, -89, -85, -81, -77, -73, -69, -65, -61, -57, -53, -49, -45, -41, -37, -33, -29, -25, -21, -17, -13, -9, -5, -2, 2, 5, 9, 13, 17, 21, 25, 29, 33, 37, 41, 45, 49, 53, 57, 61, 65, 69, 73, 77, 81, 85, 89, 93, 97, 101, 105, 109, 113, 117 |

CHANNEL DESCRIPTION FEEDBACK IN A COMMUNICATION SYSTEM

CROSS-REFERENCES TO RELATED APPLICATIONS

This application is a continuation of U.S. application Ser. No. 13/207,003, filed Aug. 10, 2011, which claims the benefit of the following U.S. Provisional Patent Applications:

U.S. Provisional Patent Application No. 61/372,376, filed on Aug. 10, 2010;

U.S. Provisional Patent Application No. 61/407,705, filed on Oct. 28, 2010.

The disclosures of all of the patent applications referenced above are hereby incorporated by reference herein in their entireties.

FIELD OF THE DISCLOSURE

The present disclosure relates generally to communication networks and, more particularly, to channel description feedback in a communication system.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Development of wireless local area network (WLAN) standards such as the Institute for Electrical and Electronics Engineers (IEEE) 802.11a, 802.11b, 802.11g, and 802.11n Standards, has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, and the IEEE 802.11n Standard specifies a single-user peak throughput of 600 Mbps. Work has begun on a new standard, IEEE 802.11ac, that promises to provide even greater throughput.

SUMMARY

In one embodiment, a method for estimating a channel between a transmitter and a receiver in a communication network includes receiving, at the receiver, a plurality of training signal fields, wherein each training signal field includes a plurality of orthogonal frequency division multiplexing (OFDM) tones, wherein the OFDM tones include at least i) a plurality of training data tones and ii) one or more pilot tones. The method also includes determining channel estimate data corresponding to i) the plurality of training data tones and ii) the one or more pilot tones. The method further includes transmitting to the transmitter i) channel estimate data corresponding to only a subset of the OFDM tones or ii) data generated using the channel estimate data corresponding to the subset of OFDM tones, wherein the subset excludes pilot tones.

In another embodiment, an apparatus comprises a wireless network interface configured to receive a plurality of training signal fields, wherein each training signal field includes a plurality of orthogonal frequency division multiplexing (OFDM) tones, wherein the plurality of OFDM tones include at least i) a plurality of training data tones and ii) one or more pilot tones. The wireless network interface is also configured to determine channel estimate data corresponding to i) the plurality of training data tones and ii) the one or more pilot tones. The wireless network interface is further configured to transmit to the transmitter i) channel estimate data corresponding to only a subset of the OFDM tones or ii) data generated using the channel estimate data corresponding to the subset of OFDM tones, wherein the subset excludes pilot tones.

BRIEF DESCRIPTION OF THE DRAWINGS

FIG. 4 is a table showing example feedback tone mappings for a 20 MHz channel, according to various embodiments.

FIG. 5 is another table showing example feedback tone mappings for a 20 MHz channel, according to various other embodiments.

FIG. 6 is a table showing example feedback tone mappings for a 40 MHz channel, according to various embodiments.

FIG. 7 is a table showing example feedback tone mappings for 80 MHz and 160 MHz channels, according to some embodiments.

FIG. 8 is another table showing example feedback tone mappings for 80 MHz and 160 MHz channels, according to some other embodiments.

DETAILED DESCRIPTION

In embodiments described below, a wireless network device such as an access point (AP) of a wireless local area network (WLAN) transmits data streams to one or more client stations. In an embodiment, a data stream transmitted by the AP to a client station includes several training fields that allow the client station to develop a channel estimate (or an estimate of the channel response) describing the effects that the communication channel had on the transmitted data stream, and thereby allow the client station to accurately recover the transmitted information. Additionally, in some embodiments, the client station transmits a channel estimate in some form (including uncompressed/compressed steering vectors, null space vectors, etc.) back to the AP. In some embodiments, the AP, in a technique known as explicit beamforming, utilizes the received channel estimates to produce an antenna gain pattern having one or more lobes or beams (as compared to the gain obtained by an omni-directional antenna) in the general direction of the client station antennas, with generally reduced gain in other directions. In other embodiments, the AP utilizes the received channel estimates for a different purpose such as space-time encoding, precoding for spatial multiplexing, etc.

In some embodiments, such as embodiments utilizing multiple input, multiple output (MIMO) channels and/or orthogonal frequency division multiplexing (OFDM), the amount of channel estimate data fully characterizing the communication channel ("a full channel estimate") is large. In embodiments utilizing multiple transmit and receive antennas (i.e., MIMO channels), for example, a full channel estimate includes estimates of the sub-channels corresponding to each transmit and receive antenna pair. Further, in embodiments utilizing orthogonal frequency division multiplexing (OFDM), a full channel estimate includes channel estimates at each of the subcarrier frequencies. Therefore, to reduce the amount of channel estimate data transmitted from a client station to the AP, in some embodiments, the client station transmits only a subset of the full channel estimate data. For example, in some embodiments utilizing OFDM-based communication, a technique of subcarrier grouping is utilized in which the OFDM subcarriers are combined into groups, and channel estimate data corresponding to only one subcarrier in each group is transmitted back to the AP. In some such embodiments, the AP 14, upon receiving the subset, utilizes interpolation, duplication, or another suitable technique to generate channel estimate data corresponding to the remaining subcarriers.

Figure 1:
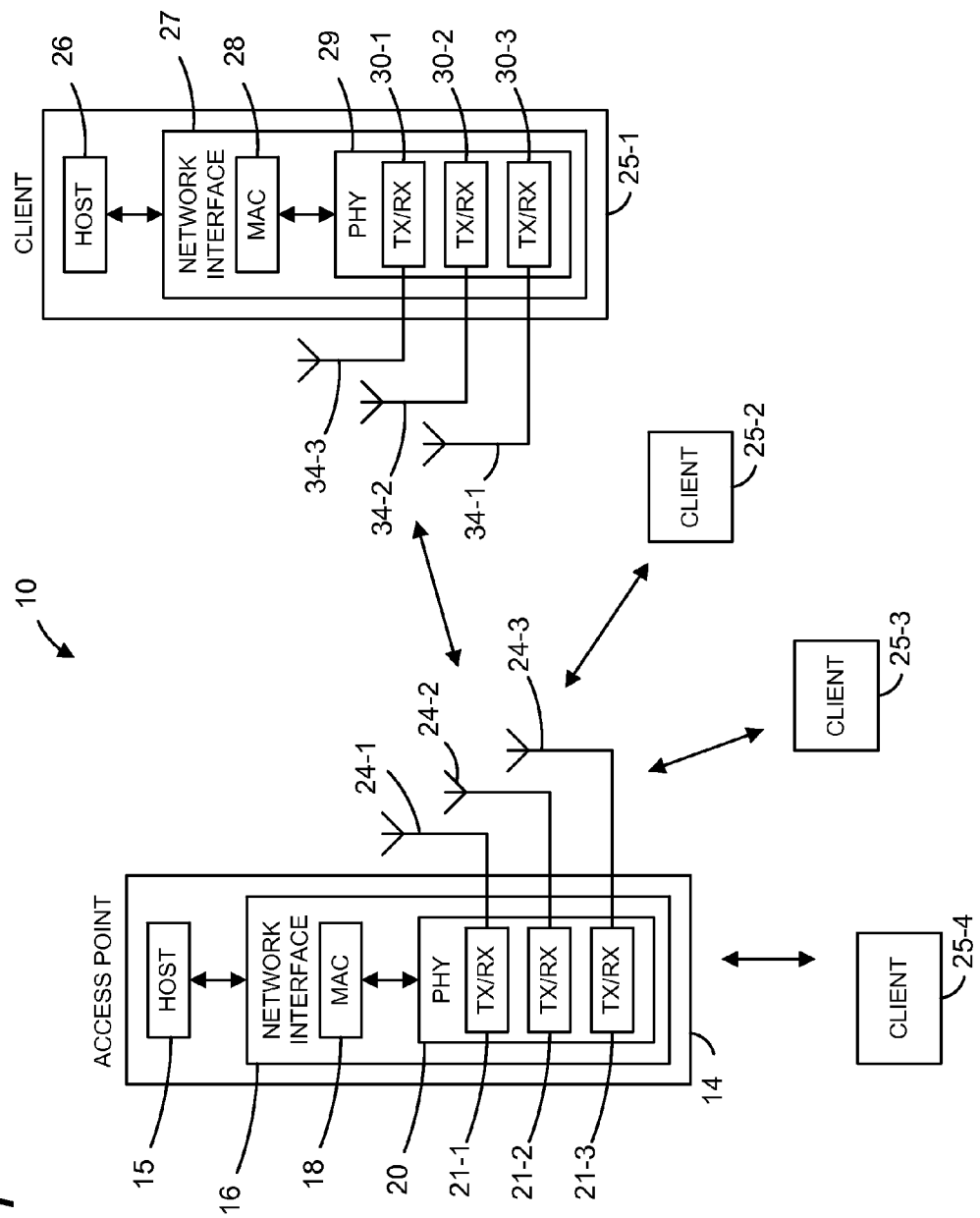
FIG. 1 is a block diagram of an example wireless local area network (WLAN), according to an embodiment.

FIG. 1 is a block diagram of an example wireless local area network (WLAN) 10, according to an embodiment. An AP 14 includes a host processor 15 coupled to a network interface 16. The network interface 16 includes a medium access control (MAC) processing unit 18 and a physical layer (PHY) processing unit 20. The PHY processing unit 20 includes a plurality of transceivers 21, and the transceivers are coupled to a plurality of antennas 24. Although three transceivers 21 and three antennas 24 are illustrated in FIG. 1, the AP 14 includes different numbers (e.g., 1, 2, 4, 5, etc.) of transceivers 21 and antennas 24 in other embodiments. In one embodiment, the MAC processing unit 18 and the PHY processing unit 20 are configured to operate according to a first communication protocol. The first communication protocol is also referred to herein as a very high throughput (VHT) protocol. In another embodiment, the MAC unit processing 18 and the PHY processing unit 20 are also configured to operate according to at least a second communication protocol (e.g., the IEEE 802.11n Standard, the IEEE 802.11g Standard, the IEEE 802.11a Standard, etc.).

The WLAN 10 includes a plurality of client stations 25. Although four client stations 25 are illustrated in FIG. 1, the WLAN 10 includes different numbers (e.g., 1, 2, 3, 5, 6, etc.) of client stations 25 in other scenarios and/or embodiments. At least one of the client stations 25 (e.g., client station 25-1) is configured to operate at least according to the first communication protocol.

The client station 25-1 includes a host processor 26 coupled to a network interface 27. The network interface 27 includes a MAC processing unit 28 and a PHY processing unit 29. The PHY processing unit 29 includes a plurality of transceivers 30, and the transceivers 30 are coupled to a plurality of antennas 34. Although three transceivers 30 and three antennas 34 are illustrated in FIG. 1, the client station 25-1 includes different numbers (e.g., 1, 2, 4, 5, etc.) of transceivers 30 and antennas 34 in other embodiments.

In an embodiment, one or all of the client stations 25-2, 25-3 and 25-4 has a structure the same as or similar to the client station 25-1. In these embodiments, the client stations 25 structured the same as or similar to the client station 25-1 have the same or a different number of transceivers and antennas. For example, the client station 25-2 has only two transceivers and two antennas, according to an embodiment.

In various embodiments, the PHY processing unit 20 of the AP 14 is configured to generate data units conforming to the first communication protocol. The transceiver(s) 21 is/are configured to transmit the generated data units via the antenna(s) 24. Similarly, the transceiver(s) 24 is/are configured to receive the data units via the antenna(s) 24. The PHY processing unit 20 of the AP 14 is configured to process received data units conforming to the first communication protocol, according to an embodiment.

In various embodiments, the PHY processing unit 29 of the client device 25-1 is configured to generate data units conforming to the first communication protocol. The transceiver(s) 30 is/are configured to transmit the generated data units via the antenna(s) 34. Similarly, the transceiver(s) 30 is/are configured to receive data units via the antenna(s) 34. The PHY processing unit 29 of the client device 25-1 is configured to process received data units conforming to the first communication protocol, according to an embodiment.

Figure 2:
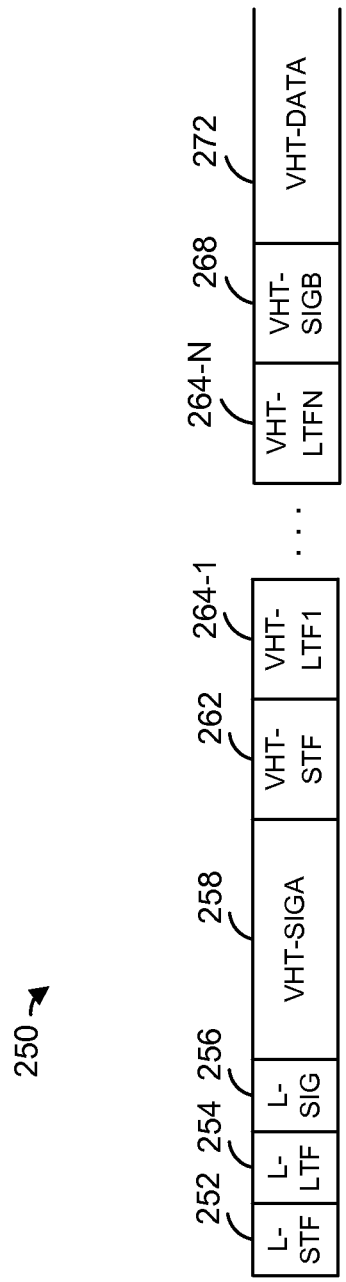
FIG. 2 is a diagram of an example data unit format, according to an embodiment.

FIG. 2 is a diagram of an example data unit 250 that the AP 14 is configured to transmit to the client station 25-1, according to an embodiment. In an embodiment, the client station 25-1 is also configured to transmit data units of the format of FIG. 2 to the AP 14. The data unit 250 includes a preamble having a legacy short training field (L-STF) field 252, a legacy long training field (L-LTF) field 254, a legacy signal field (L-SIG) field 256, a first very high throughput signal field (VHT-SIGA) 258, a very high throughput short training field (VHT-STF) 262, N very high throughput long training fields (VHT-LTFs) 264, where N is an integer, and a second very high throughput signal fields (VHT-SIGB) 268. The data unit 250 also includes a data portion 272. The data portion 272 includes service bits and information bits (not shown).

In an embodiment, the VHT-LTF fields 264 of the data unit 250 include training data that allows a client station to develop an estimate of the communication channel between the AP and the client station. The number of VHT-LTF fields included in the data unit 250 generally corresponds to the number of spatial channels via which the data unit 250 is to be transmitted, in various embodiments and/or scenarios. In some embodiments, however, the number of VHT-LTF fields included in the data unit 250 exceeds the number of spatial channels via which the data unit 250 is to be transmitted, at least in some scenarios. Further, according to an embodiment, as each VHT-LTF training field is transmitted to a client station, the AP 14 applies a different mapping of symbols to the spatial streams thereby allowing the client station to develop a full multiple input multiple output (MIMO) channel estimate of the communication channel. Further still, in an embodiment utilizing orthogonal frequency division multiplexing (OFDM), the client station develops a channel estimate corresponding to each of the subcarrier tones.

Figure 3:
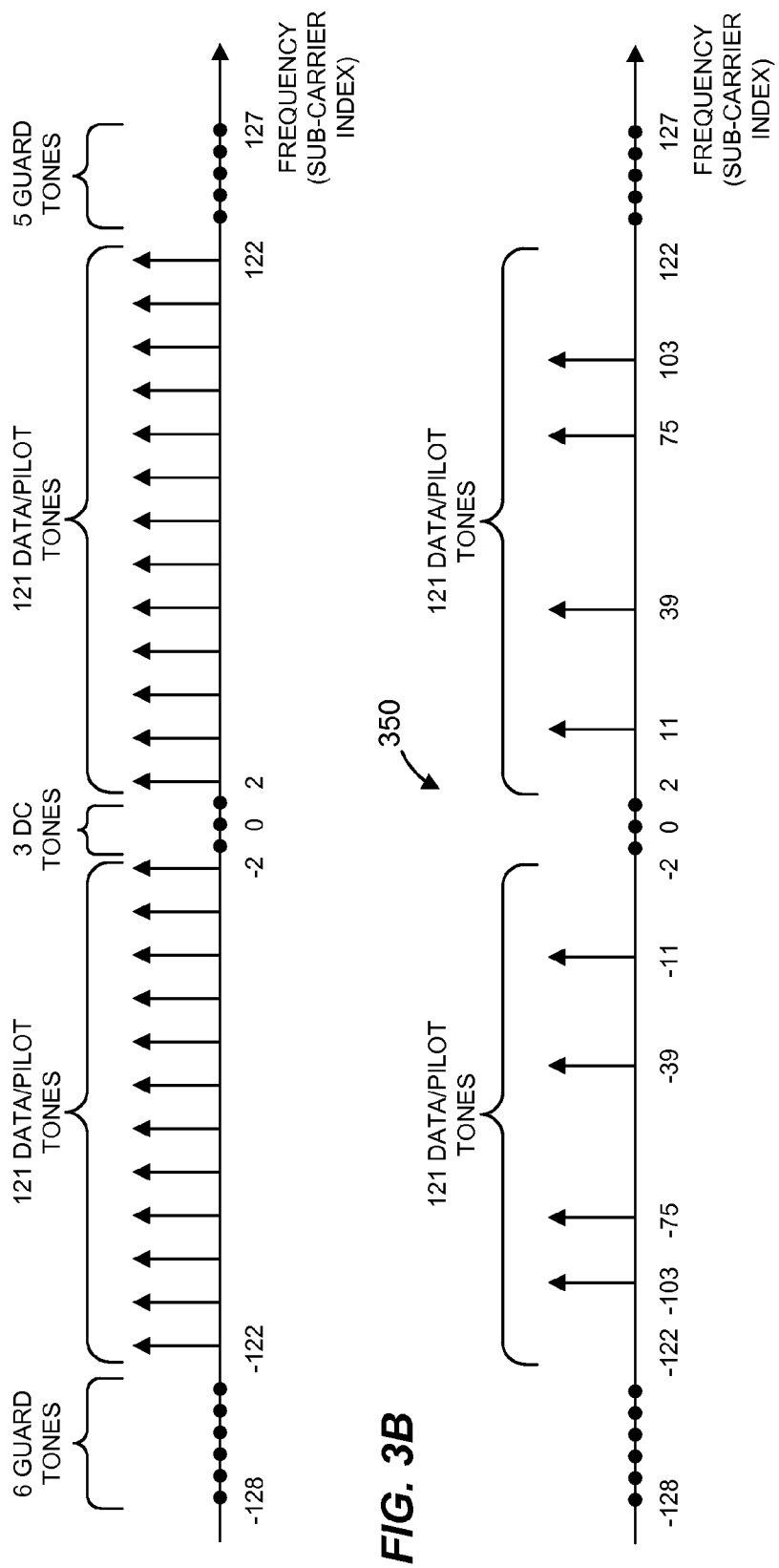
FIG. 3A is a diagram of an example orthogonal frequency division multiplexing (OFDM) symbol, according to an embodiment.
FIG. 3B is a diagram illustrating example pilot tone locations in an OFDM symbol, according to an embodiment.

FIG. 3A is a frequency domain diagram of an OFDM symbol 350 included in the data unit 250, according to an embodiment in which the data unit 250 occupies an 80 MHz bandwidth channel. In the illustrative embodiment of FIG. 3A, the OFDM symbol 350 includes 256 tones (e.g., corresponding to a size 256 inverse discrete Fourier transform (IDFT)). The 256 tones are indexed from −128 to +127 and include guard tones, direct current (DC) tones, data tones, and pilot tones. The six lowest frequency tones and the five highest frequency tones are guard tones. The three tones indexed from −1 to +1 are DC tones. In an embodiment, the remaining 242 tones are used as data tones and pilot tones. For example, in one embodiment, eight of the 242 tones are used for pilot tones, and accordingly, in this embodiment, 234 tones are used as data tones. The data tones at the highest absolute value indices (i.e., ±122 in the example symbol 350) are referred to herein as "edge tones". Data tones in a training signal field (e.g., VHT-LTF field 264 in FIG. 2) are referred to herein as "training data tones."

FIG. 3B is a diagram illustrating example pilot tone locations in the OFDM symbol 350, according to an embodiment.

As shown in FIG. 3B, the eight pilot tones occupy subcarrier indices {±103, ±75, ±39, ±11}. In other embodiments, the eight pilot tones occupy other suitable subcarrier indices. Further, in some embodiments, the OFDM symbol 350 includes a different number of pilot tones, for example two pilot tones, four pilot tones, six pilot tones, ten pilot tones, or any other suitable number of pilot tones, and the pilot tones are located at any suitable subcarrier indices within the OFDM symbol 350.

In some embodiments, the data unit 250 occupies a channel that is different than an 80 MHz bandwidth channel described above. For example, the data unit 250 occupies a 20 MHz channel, a 40 MHz channel, 160 MHz channel or any other suitable bandwidth channel in some embodiments and/or scenarios. In such embodiments, the OFDM symbols included in the data unit 250 include different numbers of tones, and, accordingly, different numbers of tones are reserved for pilot tones as compared to a data unit that occupies an 80 MHz channel. For example, in one embodiment, a 20 MHz OFDM symbol includes four pilot tones located at sub-carrier indices {±7, ±21}. In an embodiment, a 40 MHz OFDM symbol includes six pilot tones located at sub-carrier indices {±11, ±25, ±53}. In other embodiments utilizing 20 MHz or 40 MHz channels, different numbers of pilot tones and/or different pilot tone locations than discussed above are utilized. For a 160 MHz OFDM symbol, in one embodiment, the number of pilot tones and the pilot tone locations are chosen based on pilot tone numbers and positions in constituent 80 MHz OFDM symbols. In other embodiments, the number of pilot tones and the pilot tone locations for a 160 MHz OFDM symbol are chosen regardless of the number and locations of the pilot tones specified for an 80 MHz OFDM symbol.

According to some embodiment, different pilot tone values are utilized depending on the OFDM symbol index and the spatial stream index. That is, in these embodiments, the pilot tones are defined as multi-stream tones. Various example transmission channels and pilot tone mappings and values that are utilized in some such embodiments are described in U.S. patent application Ser. No. 12/846,681, entitled "Methods and Apparatus for WLAN Transmission", filed on Jul. 29, 2010, which is hereby incorporated by reference herein in its entirety.

Referring again to FIG. 2, in an embodiment, as discussed above, each VHT-LTF field 264 includes training data corresponding to each subcarrier frequency of an OFDM symbol, allowing the client station 25-1 to determine a full MIMO channel estimate for each tone. On the other hand, to improve accuracy of the channel estimate by eliminating or reducing errors associated with a frequency drift between the AP and the client station, in some embodiments, some of the tones in the VHT-LTF training fields are used as pilot tones that allow frequency and/or phase to be tracked during reception of the training fields. However, in order to implement frequency and/or phase tracking based on pilot tones, a client station generally requires knowledge of the channel response characterizing the communication channel between the AP and the client station. In the case of a MIMO channel, a full MIMO channel estimate, therefore, needs to be known for accurate frequency and/or phase tracking. However, a full MIMO channel estimate generally cannot be determined until all of the training fields included in a data unit (e.g., all of the VHT-LTF 264 in the data unit 250 of FIG. 2) are received at the client station.

Accordingly, pilot tones included in the training signal field OFDM symbols in some embodiments are "single stream" pilot tones, that is, the values of these pilot tones are defined based only on the OFDM symbol index, and are independent of the spatial stream index. In these embodiments, therefore, a client station determines a multiple input, single output (MISO) channel estimate for the pilot tones, and performs phase and/or frequency tracking using the MISO channel estimate. Consequently, in such embodiments, a client station is unable to obtain a MIMO channel estimate for OFDM sub-carriers corresponding to pilot tone locations in the training signal fields.

As discussed above, in some embodiments, a client station determines channel estimate data corresponding to each OFDM subcarrier and feeds at least a portion of the channel estimate data back to the AP. Ideally, the feedback data includes channel estimates corresponding to each tone in an OFDM symbol. However, in some embodiments, due to, for example, wide channel bandwidths and/or large numbers of spatial streams, transmitting channel data for every subcarrier is, in some cases, unpractical and/or degrades performance. For example, in a case of a relatively fast varying communication channel, the amount of time required to transmit channel estimate data for every subcarrier exceeds the amount of time during which these channel estimates are valid, according to one embodiment. Accordingly, to reduce the amount of feedback, in some embodiments, the client station 25-1 transmits channel estimate data corresponding to only a subset of the subcarriers. For example, according to an embodiment, the client station 25-1 feeds back channel estimate data corresponding to one tone in a group of a number of adjacent tones. The tones for which channel estimate data is fed back to the AP 14 are referred to herein as "feedback tones". Similarly, the tones for which channel data is not fed back to the AP 14 are also referred to herein as "non-feedback tones".

In embodiments described below in which a client station cannot determine a full MIMO channel estimate corresponding to the pilot tones of a training field OFDM symbol (e.g., the VHT-LTFs 264 in FIG. 2), channel data corresponding to the pilot tones is then not transmitted back to the AP 14. That is, in these embodiments, the feedback tones do not include subcarrier indices corresponding to pilot tone locations. On the other hand, to simplify receiver and/or transmitter implementation, in some embodiments, the feedback tones include edge tones and/or tones adjacent to the DC tones in an OFDM symbol.

FIG. 4 is a table showing example feedback tone mappings for a 20 MHz channel, according to various embodiments and/or scenarios in which the client station 25-1 utilizes different subcarrier groupings to transmit channel estimate data back to the AP 14. In an embodiment utilizing a tone grouping of one ($N_g=1$), for example, feedback tones include all training data tones, and exclude the tones corresponding to the training field pilot tone locations. In an embodiment utilizing a tone grouping of two ($N_g=2$), on the other hand, the client station 25-1 feeds back channel data corresponding to only 30 tones (e.g., corresponding to subcarrier indices indicated in the appropriate row in the table). Similarly, in an embodiment utilizing a tone grouping of four ($N_g=4$), the client station 25-1 feeds back channel data corresponding to only 16 tones (e.g., corresponding to the subcarrier indices indicated in the appropriate row in the table). Similar to the example embodiment utilizing a tone grouping of one ($N_g=1$), in the example embodiments utilizing tone groupings of two and four, the feedback tones do not include subcarrier indices corresponding to pilot tone locations. Further, in the embodiments of FIG. 4, feedback tones for the four tone grouping case ($N_g=4$) includes only a subset of the feedback tones for the two tone grouping case ($N_g=2$) (i.e., the feedback tones for the four tone grouping case ($N_g$=4) does not include any tones that are not included in the feedback tones for the two tone grouping case ($N_g$=2)).

FIG. 5 is a table showing another example feedback tone mappings for a 20 MHz channel, according to various other embodiments and/or scenarios. The table of FIG. 5 is similar to the table of FIG. 4 except that in the table of FIG. 5 the feedback tones in the lower and the upper sidebands are symmetrical with respect to each other in every tone grouping (i.e., $N_g$=1, $N_g$=2, $N_g$=4). As in the embodiments described above with respect to FIG. 4, in the embodiments of FIG. 5, channel estimate data corresponding to the pilot tone locations is not fed back.

FIG. 6 is a table showing example feedback tone mappings for a 40 MHz channel, according to various embodiments and/or scenarios in which the client station 25-1 utilizes different subcarrier groupings to transmit channel estimate data back to the AP 14. As illustrated in FIG. 6, in an embodiment utilizing a tone grouping of one ($N_g$=1), similar to the case of a 20 MHz channel discussed above, feedback tones include all training data tones, and exclude the tones corresponding to the pilot tone locations. In an embodiment utilizing a tone grouping of two ($N_g$=2) in accordance with FIG. 6, the client station feeds back channel estimate data corresponding to 58 tones (e.g., at the indices indicated in the appropriate row of the table). Similarly, in an embodiment utilizing a tone grouping of four ($N_g$=4), the client station feeds back channel estimate data corresponding to 30 tones (e.g., at the indices indicated in the appropriate row of the table). Similar to the case of a tone grouping of one ($N_g$=1), in the embodiments utilizing tone groupings of two and four, the feedback tones do not include subcarrier indices corresponding to pilot tone locations. Further, similar to the embodiments of FIG. 4, in the embodiments of FIG. 6, feedback tones for the four tone grouping case ($N_g$=4) includes only a subset of the feedback tones for the two tone grouping case ($N_g$=2) (i.e., the feedback tones for the four tone grouping case ($N_g$=4) does not include any tones that are not included in the feedback tones for the two tone grouping case ($N_g$=2)).

FIG. 7 is a table showing example feedback tone mappings for 80 MHz and 160 MHz channels, according to some embodiments and/or scenarios. In an embodiment utilizing a tone grouping of one ($N_g$=1) for an 80 MHz channel, similar to the 20 MHz and the 40 MHz cases described above, feedback tones include all training data tones, and exclude the tones corresponding to the pilot tone locations. In an embodiment utilizing a tone grouping of two ($N_g$=2) for an 80 MHz channel, the client station feeds back channel estimate data corresponding to 118 tones (e.g., at the indices indicated in the appropriate row in the table). Similarly, in an embodiment utilizing a tone grouping of four ($N_g$=4) for an 80 MHz channel, the client station feeds back channel data corresponding to 62 tones (e.g., at the indices indicated in the appropriate row in the table). In embodiments utilizing the above tone groupings for a 160 MHz channel, the feedback carrier indices indicated in the table correspond to the constituent 80 MHz channels. Further, feedback tones for the four tone grouping case ($N_g$=4) includes only a subset of the feedback tones for the two tone grouping case ($N_g$=2) in some embodiments (i.e., the feedback tones for the four tone grouping case ($N_g$=4) does not include any tones that are not included in the feedback tones for the two tone grouping case ($N_g$=2)).

FIG. 8 is a table showing another example feedback tone mappings for 80 MHz and 160 MHz channels, according to some other embodiments and/or scenarios. The table of FIG. 8 is similar to the table of FIG. 7, except that in the embodiments utilizing tone mappings of FIG. 8 the edge tones as well as the pilot tones are excludes from the feedback tone subsets. Accordingly, the table of FIG. 8 indicates 232 feedback tones for a tone grouping of one for an 80 MHz channel, 116 feedback tones for a tone grouping of two for an 80 MHz channel, and 58 feedback tones for a tone grouping of four for an 80 MHz channel. Similar to FIG. 7, in embodiments utilizing the above tone groupings for a 160 MHz channel, the feedback carrier indices indicated in the table correspond to the constituent 80 MHz channels.

Figure 9:
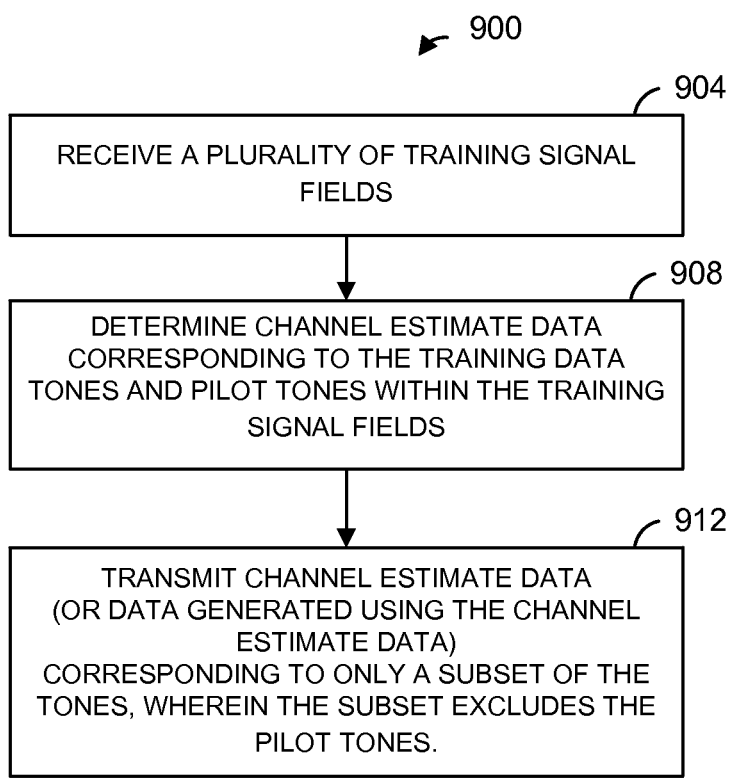
FIG. 9 is a flow diagram of an example method for transmitting channel estimate data from a receiver to a transmitter, according to an embodiment.

FIG. 9 is a flow diagram of an example method 900 for transmitting channel estimate data from a receiver to a transmitter, according to an embodiment. With reference to FIG. 1, the method 900 is implemented by the network interface 16, in an embodiment. For example, in one such embodiment, the PHY processing unit 20 is configured to implement the method 900. According to another embodiment, the MAC processing 18 is also configured to implement at least a part of the method 900. With continued reference to FIG. 1, in yet another embodiment, the method 900 is implemented by the network interface 27 (e.g., the PHY processing unit 29 and/or the MAC processing unit 28). In other embodiments, the method 900 is implemented by other suitable network interfaces.

At block 904, a receiver receives a plurality of training signal fields from a transmitter. In an embodiment, the training signal fields are VHT-LTF fields 264 in FIG. 2. Each of the training fields received at block 904 includes one or more OFDM symbols, such as the OFDM symbol 350 of FIG. 3A, according to an embodiment. The tones of the OFDM symbol include at least training data tone and pilot tones. The pilot tones are at locations illustrated in FIG. 3B, according to one embodiment. In other embodiments, different numbers of pilot tones and/or different pilot tone locations are used.

At block 908, the receiver determines channel estimate data corresponding to the training data tones and the pilot tones in the OFDM symbols received at block 904. In one embodiment, the channel estimate data corresponding to the training data tones corresponds to a MIMO channel estimate, while the channel estimate data corresponding to the pilot tones corresponds to MISO channel estimate.

At block 912, the receiver transmits channel estimate data corresponding to only a subset of the OFDM symbol tones, or data generated using the channel estimate data corresponding to only a subset of the OFDM symbol tones, back to the transmitter. In an embodiment, the subset excludes all of the pilot tones. That is, in this embodiment, channel estimate data transmitted back to the transmitter excludes MISO channel estimate data. In some embodiments, channel estimate data corresponding to one tone in every group of two adjacent data/pilot tones in the OFDM symbol, or channel data corresponding to one tone in every group of four adjacent data/pilot tones in the OFDM symbol, is transmitted back to the transmitter at block 912. In some example embodiments, the channel estimate data, or the data generated using the channel estimate data, transmitted back to the transmitter at block 912 corresponds to the index locations illustrated in FIGS. 4-8. In one embodiment, the data generated using the channel estimate data is in the form of a steering vector for steering signals from the transmitter in the direction of the receiver. In another embodiment, the data generated using the channel estimate data is in the form of vectors that span a null space of the channel estimate data.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for estimating a channel between a first communication device and a second communication device in a communication network, the method comprising:
   receiving, at the second communication device, a plurality of training signal fields in a preamble of a data unit, the plurality of training signal fields having been transmitted via orthogonal frequency division multiplexing (OFDM) symbols comprising data tones and pilot tones;
   determining, by the second communication device, first channel estimate data corresponding to the data tones in the OFDM symbols corresponding to the plurality of training signal fields and second channel estimate data corresponding to the pilot tones in the OFDM symbols corresponding to the plurality of training signal fields;
   generating, by the second communication device, feedback data that i) includes data corresponding to the first channel estimate data, and ii) excludes data corresponding to the second channel estimate data; and
   transmitting, by the second communication device, the feedback data to the first communication device.

2. The method of claim 1, wherein the first channel estimate data includes multiple input, multiple output (MIMO) channel estimate data and the second channel estimate data includes multiple input, single output (MISO) channel estimate data.

3. The method of claim 2, wherein the pilot tones in the OFDM symbols corresponding to the plurality of training signal fields comprise single-stream pilot tones.

4. The method of claim 1, wherein generating the feedback data comprises generating the data corresponding to the first channel estimate data to exclude at least some of the first channel estimate data.

5. The method of claim 1, further comprising developing a channel estimate corresponding to i) each of the data tones in the OFDM symbols corresponding to the plurality of training signal fields, and ii) each of the pilot tones in the OFDM symbols corresponding to the plurality of training signal fields, wherein the channel estimate includes the first channel estimate data and the second channel estimate data.

6. A first communication device for estimating a channel between the first communication device and a second communication device in a communication network, comprising:
   a wireless network interface having one or more integrated circuits configured to:
      receive a plurality of training signal fields in a preamble of a data unit, the plurality of training signal fields having been transmitted via orthogonal frequency division multiplexing (OFDM) symbols comprising data tones and pilot tones;
      determine first channel estimate data corresponding to the data tones in the OFDM symbols corresponding to the plurality of training signal fields and second channel estimate data corresponding to the pilot tones in the OFDM symbols corresponding to the plurality of training signal fields;
      generate feedback data that i) includes data corresponding to the first channel estimate data, and ii) excludes data corresponding to the second channel estimate data; and
      transmit the feedback data to the second communication device.

7. The first communication device of claim 6, wherein the first channel estimate data includes multiple input, multiple output (MIMO) channel estimate data and the second channel estimate data includes multiple input, single output (MISO) channel estimate data.

8. The first communication device of claim 7, wherein the pilot tones in the OFDM symbols corresponding to the plurality of training signal fields comprise single-stream pilot tones.

9. The first communication device of claim 6, wherein the one or more integrated circuits are configured to generate the data corresponding to the first channel estimate data to exclude at least some of the first channel estimate data.

10. The first communication device of claim 6, wherein the one or more integrated circuits are configured to develop a channel estimate corresponding to i) each of the data tones in the OFDM symbols corresponding to the plurality of training signal fields, and ii) each of the pilot tones in the OFDM symbols corresponding to the plurality of training signal fields, wherein the channel estimate includes the first channel estimate data and the second channel estimate data.

* * * * *